Nov. 8, 1966

D. L. RUNYAN 3,283,843

AXLE CONSTRUCTION

Filed July 27, 1964

INVENTOR.
Doward L. Runyan
BY
Harness and Harris
ATTORNEYS.

INVENTOR.
Doward L. Runyan.
BY
Harness and Harris
ATTORNEYS.

United States Patent Office 3,283,843
Patented Nov. 8, 1966

3,283,843
AXLE CONSTRUCTION
Doward L. Runyan, Berkley, Mich., assignor to Chrysler Corporation, Highland Park, Mich., a corporation of Michigan
Filed July 27, 1964, Ser. No. 385,352
6 Claims. (Cl. 180—88)

This invention relates to vehicular running gear and, more particularly, to a rear axle construction for a motor vehicle.

It is generally conceded that a flanged axle, i.e., an axle in which the shaft portion and the flange portion are formed as a single piece, possesses strength and deflection characteristics superior in many respects to those of a two piece axle, i.e., an axle in which the flange is formed as a separate member removably mounted on the tapered end of a separate axle shaft.

It is also generally conceded that a tapered roller bearing possesses load characteristics superior in many respects to those of a comparable size ball bearing.

Axle constructions employing flanged axles are known, but to my knowledge they all use a ball rather than a tapered roller bearing. Axle constructions employing tapered roller bearings are also known, but to my knowledge they all employ a two-piece axle rather than a flanged axle.

Attempts have been made to device an axle construction combining the superior strength characteristics of a flanged axle with the superior load carrying ability of a tapered roller bearing. Such attempts have been unsuccessful, however, largely because the shimming operations customarily used to adjust the load and play in a roller bearing became prohibitively expensive and time consuming when a one piece flanged axle is used.

Accordingly, it is an object of the present invention to provide an improved vehicular running gear.

It is a more specific object to provide an improved motor vehicle rear axle construction.

It is a yet more specific object to provide a rear axle construction combining the superior strength characteristics of a flanged axle with the superior load characteristics of a tapered roller bearing.

It is another object to provide such a rear axle construction having means to allow ready and selective adjustment of the play in, and loading of, the bearing.

Another object is to provide such a rear axle construction in which the play in and loading of both left and right bearings may be adjusted by a single adjustment at one of the bearings.

These and other objects, features and advantages of the invention will be apparent from the following detailed description of a preferred embodiment of the invention, and from the accompanying drawings in which.

Figure 1:
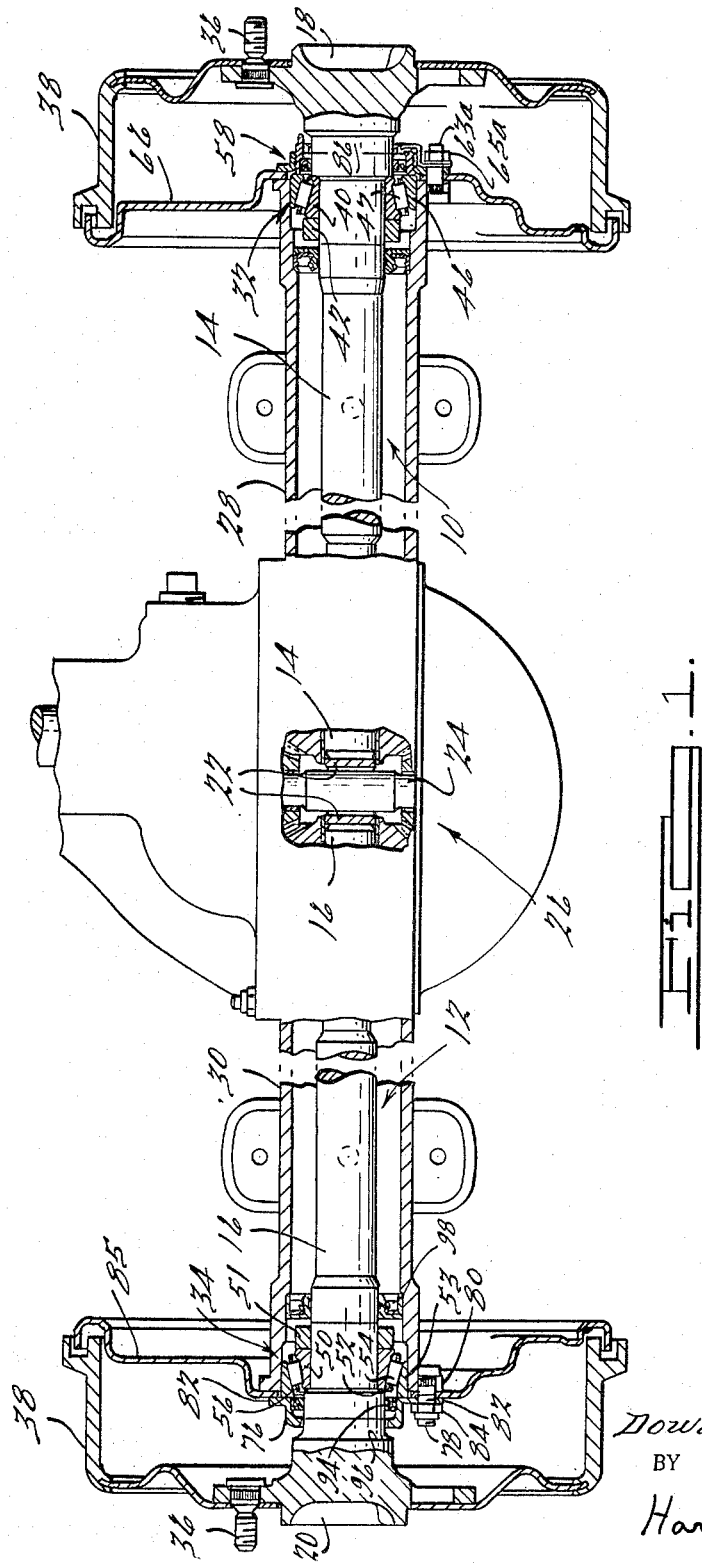
FIGURE 1 is a top view, partially in section, of a rear axle construction according to the present invention.

Referring first to FIGURE 1, the rear axle construction of the invention includes right and left axles 10 and 12. Each axle is formed as a single piece extrusion and includes a shaft portion 14, 16 and a flange portion 18, 20.

Shaft portions 14, 16 are separated at their inner ends by a spacer block 22 passing the pinion gear shaft 24 of a conventional differential assembly shown generally at 26.

Each shaft portion 14, 16 is received within a respective axle housing 28, 30 and extends at its outer end beyond the housing to its integral flange portion 18, 20. A tapered roller bearing assembly 32, 34 is mounted in each of the axle housings to rotatably receive the respective axle shaft portion.

Each flange portion 18, 20 is provided with a circular series of bolt holes for passage of bolts 36. A brake drum 38 of known construction seats over bolts 36. Bolts 36 also serve in known manner for securement of the usual wheels (not shown).

Figure 2:
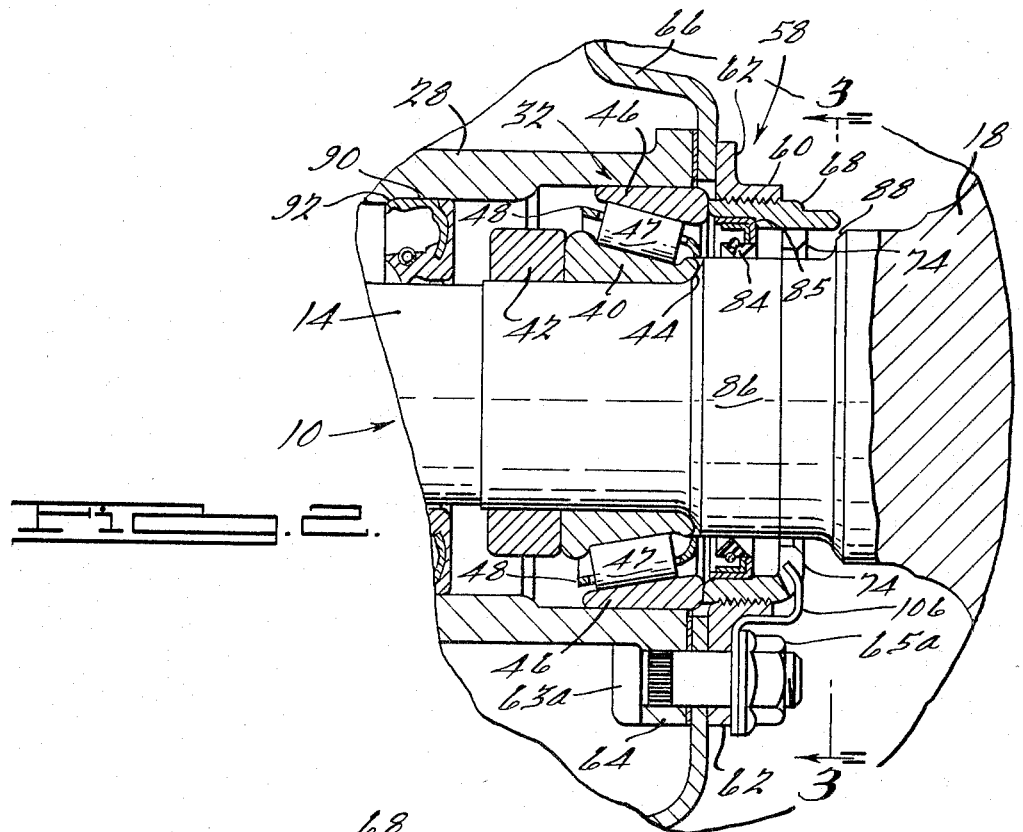
FIGURE 2 is a sectional view on an enlarged scale of a portion of the axle construction of FIGURE 1.

Referring now to FIGURE 2, showing an enlargement of the axle construction proximate the right wheel assembly, bearing assembly 32 includes an inner race or cone 40 press fitted on shaft portion 14 of axle 10. Race 40 is further restrained from axial movement relative to shaft portion 14 by a collar 42 press fitted on the shaft portion and by a concave shoulder 44 formed in the shaft portion to snugly receive the convex axially outer face of race 40. Bearing 32 also includes an outer race or cup 46 received with a sliding fit in the outer end of axle housing 28, and the usual series of tapered rollers 47 rollably disposed between the inner and outer races and maintained in peripherally spaced relation by a cage 48.

Bearing assembly 34, as seen in FIGURE 1, is identical to bearing assembly 32 and includes a press fitted inner race 50 held between collar 51 and shoulder 52, an outer race 53 slidably received in the end of axle housing 30, and rollers 54 held in peripherally spaced relation by cage 56.

Referring again to FIGURE 2, a retainer ring 58 is provided for coaction with bearing assembly 32. Ring 58 includes an axially extending cylindrical portion 60 provided with internal threads, and a radial flange portion 62. Ring 58 is mounted on the outer end of axle housing 28, concentric with the axle axis, by a circular series of bolts 63 (see also FIGURE 3) passing through an axle housing flange 64 and ring flange portion 62. Nuts 65 hold ring 58 rigid to the axle housing and also clamp the usual brake backing plate 66 between flange 64 and flange portion 62. The internal diameter of portion 60 of ring 58 is less than the outer diameter of outer race 46 but greater than the inner diameter of that race at its axially outer face so as to provide a radial overlap between race 46 and ring 58.

Figure 3:
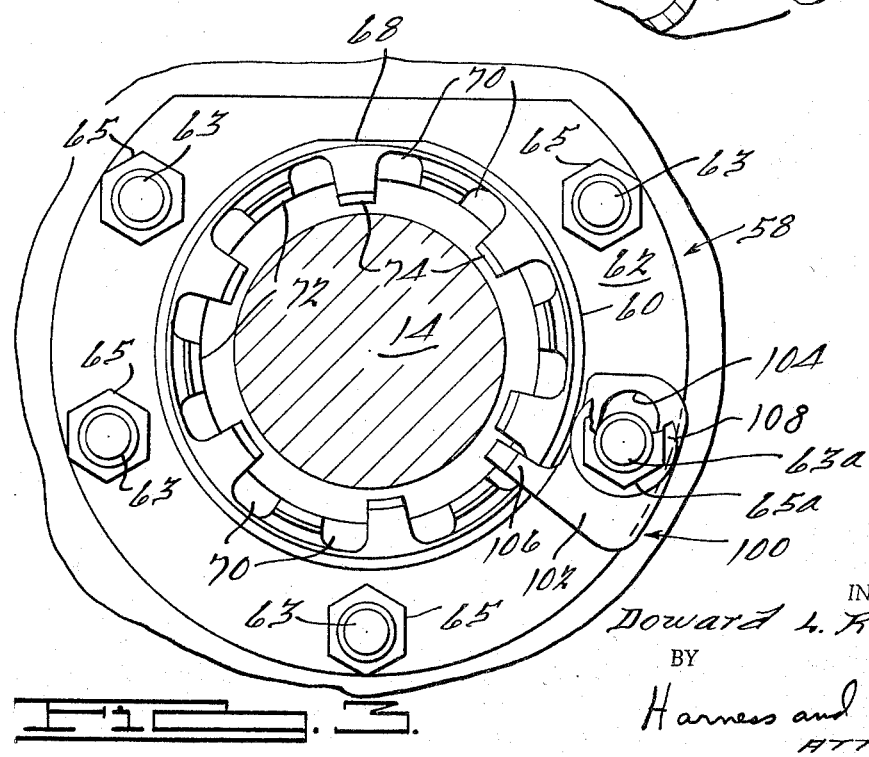
FIGURE 3 is a cross sectional view taken on line 3—3 of FIGURE 2.

An externally threaded adjustor nut 68 is adapted to be screwed into retainer ring 58. When screwed into ring 58, the forward edge of nut 68 contacts the axially outer face of outer race 46. Nut 68, as seen most clearly in FIGURE 3, is provided at its axially outer end with a series of axially extending peripherally spaced slots 70 defining therebetween a peripherally spaced series of lugs. Every other lug 72 is straight and the other lugs 74 are bent radially inward.

Referring again to FIGURE 1, the left wheel assembly includes a retainer ring 76 mounted to the outer end of housing 30, concentric with the axle axis, by a circular series of bolts 78 passing through axle housing flange 80 and flange portion 82 of ring 76. Nuts 84 fix ring 78 to the axle housing and also serve to clamp the usual brake backing plate 85 between flange portion 82 and flange 80. With ring 78 in position, the radially inner annular portion of flange portion 82 contacts the axially outer face of outer race 53 to prevent displacement of that race.

The axle is assembled as follows:

Adjustor nut 68 is screwed into retainer ring 58 and a conventional grease seal 84 is seated within ring 58 against an internal shoulder 85. The nut-ring-seal subassembly is then slipped over the axle 10 and positioned over enlarged diameter axle portion 86. Bearing assembly 32 is then pressed onto axle 10, with inner race 40 snugged up against shoulder 44, and collar 42 is pressed up against race 40 to clamp it in place.

Note that at this stage, i.e., before assembly into the axle housing, axial movement of outer race 46 relative to larged diameter axle portion 86. Bearing assembly 32 is the axle is limited either by adjustor nut 68 or by ring 58, depending upon the extent to which nut 68 is screwed into ring 58. The radially inwardly bent lugs 74 on nut 68 in turn coact with a shoulder 88 on axle 10 to limit axial movement of nut 68 so that shoulder 88, lugs 74, and ring 58 an/or nut 68 coact to prevent disassembly of bearing 32.

This assembly is then slid into axle housing 28 and through a conventional grease seal 90 which has previously been seated against an internal shoulder 92 in the housing. Brake backing plate 66 is then positioned against axle flange 64 and clamped between that flange and ring flange portion 62 by tightening of nuts 65 on bolts 63. Nut 65a is not threaded onto bolt 63a at this time for a reason that will appear hereinafter.

A similar procedure is follower with respect to the left wheel assembly. A grease seal 94 is seated within retainer ring 76 against an internal shoulder and the ring-seal subassembly is slipped over and positioned on axle 12. Bearing assembly 34 and collar 51 are then pressed on, the ring 76 and shoulder 96 or axle 12 at this stage preventing disassembly of the bearing. This subassembly is then slipped into axle housing 30 and through seal 98, whereafter brake backing plate 85 is positioned against axle housing flange 80 and the entire left assembly buttoned up by tightening of nuts 84.

A spanner wrench is now engaged with lugs 72 on adjustor nut 68 and the wrench manipulated to screw nut 68 into retainer ring 58. As the nut advances, it engages the axially outer face of outer race 46 and urges that race axially inwardly to take up the play in bearing assembly 32. Once the play in bearing assembly 32 has been taken up, that assembly acts as a rigid link so that continued advancement of nut 68 shifts axle 10 bodily to the left. Since the inner end of axle 10 bears against spacer block 22, which in turn bears against the inner end of axle 12, the spacer block and axle 12 move axially as a unit with axle 10, thereby moving inner race 50 axially outwardly relative to outer race 53 and taking up the play in bearing assembly 34. Adjustor nut 68 is then backed off until the desired extent of play is achieved in both bearing assemblies.

A lock member 100 is then applied to secure nut 68 in its position of final adjustment. Lock member 100 comprises a flat arcuate base portion 102, having an arcuate slot 104, and a finger portion 106 upstanding from the base portion and bent into a U form. The shaft of bolt 63a is passed through slot 104 and the member is shifted circumferentially, within the arcuate limits defined by the slot, to align finger portion 106 between two lugs of adjustor nut 68. Lock member 100 is then slid down bolt 63a to seat the finger portion 106 between adjacent lugs and nut 65a is tightened to hold the lock member 100, and thereby the nut 68, in position. Nut 65a is provided with a flange portion 108 to inhibit splaying of the slot 106 upon tightening of the nut.

It should be noted that adjustor nut 68, in addition to allowing adjustment of both bearings by a single adjustment at one wheel, also serves to prevent loss of a wheel in the event of rupture of axle shaft 14. That is, if shaft 14 ruptures, the ruptured shaft is prevented from moving axially out of axle housing 28 by the rigid link formed between the axle housing and the shaft through ring 58, nut 68, bearing assembly 32, and collar 42.

In a similar manner, retainer ring 76 prevents loss of the left wheel in the event of rupture of shaft 16.

Although a preferred embodiment of the invention has been illustrated and described in detail, it is to be understood that various changes may be made in the apparatus shown without departing from the scope or spirit of the invention as defined in the appended claims.

I claim:
1. A motor vehicle axle assembly comprising:
(A) elongated, axially aligned left and right axle housings;
(B) left and right axles each having a shaft portion received within a respective housing and extending at its outer end beyond that housing and disposed at its inner end in juxtaposition to the inner end of the shaft portion of the other axle;
(C) a spacer block disposed between said inner ends;
(D) a tapered roller bearing mounted in each of said axle housings and rotatably receiving the respective axle adjacent the said outer end of its shaft portion;
(E) means restraining the inner race of each of said bearings against inward axial movement along the related shaft portion;
(F) means restraining the outer race of one of said bearings against axially outward movement relative to the related axle housing;
(G) means defining a screw thread at the outer end of the axle housing receiving the other bearing; and
(H) an annular threaded adjustor member threadably engaging said screw thread on said axle housing and presenting an annular face engaging the axially outer face of the outer race of said other bearing, whereby said adjustor member may be selectively rotated to threadably advance it relative to said axle housing and thereby take up the play in said other bearing, and through bodily axial movement of said shaft portions and said spacer block, take up the play in said one bearing.

2. A motor vehicle axle assembly comprising:
(A) elongated, axially aligned left and right axle housings;
(B) left and right single piece axles each having
(1) a shaft portion received within a respective housing and extending at its outer end beyond that housing and disposed at its inner end in juxtaposition to the inner end of the shaft portion of the other axle; and
(2) a flange portion at the outer end of said shaft portion;
(C) a spacer block disposed between said inner ends;
(D) a tapered roller bearing mounted in each of said housings and rotatably receiving the respective axle adjacent the said outer end of its shaft portion;
(E) means restraining the inner race of each of said bearings against inward axial movement along the related shaft portion;
(F) means restraining the outer race of one of said bearings against axially outward movement relative to the related axle housing;
(G) means defining a screw thread at the outer end of the axle housing receiving the other bearing; and
(H) an annular threaded adjustor member threadably engaging said screw thread on said axle housing and presenting an annular face engaging the axially outer face of the outer race of said other bearing, whereby said adjustor member may be selectively rotated to threadably advance it relative to said axle housing and thereby take up the play in said other bearing, and through bodily axial movement of said shaft portions and said spacer block, take up the play in said one bearing.

3. A motor vehicle axle assembly comprising:
(A) elongated, axially aligned left and right axle housings;
(B) left and right axles each having a shaft portion received within a respective housing and extending at its outer end beyond that housing and disposed at its inner end in juxtaposition to the inner end of the shaft portion of the other axle;
(C) a spacer block disposed between said inner ends;
(D) a tapered roller bearing mounted in each of said housings and rotatably receiving the respective axle adjacent the said outer end of its shaft portion;
(E) means restraining the inner race of each of said bearings against inward axial movement along the related shaft portion;
(F) a retainer member engaging the axially outer face of the outer race of one of said bearings and rigid with the related housing;
(G) means defining a screw thread at the outer end of the axle housing receiving the other bearing; and
(H) an annular threaded adjustor member threadably engaging said screw thread on said axle housing and presenting an annular face engaging the axially outer face of the outer race of said other bearing, whereby said adjustor member may be selectively rotated to threadably advance it relative to said axle housing and thereby take up the play in said other bearing, and through bodily axial movement of said shaft portions and said spacer block, take up the play in said one bearing.

4. Vehicular running gear comprising:
(A) an elongated axle housing;
(B) an axle having a shaft portion received within, and having an outer end extending beyond, an outer end of said housing;
(C) a tapered roller bearing including
 (1) an outer race slidably mounted within said housing; and
 (2) an inner race encircling said shaft portion adjacent its said outer end and restrained against axially inward movement along said shaft portion;
(D) an internally threaded retainer ring rigid with said outer end of said housing and concentric with said shaft portion, said ring having an internal diameter less than the external diameter of, but greater than the axially outer internal diameter of, said outer race; whereby to preclude displacement of said outer race; and
(E) an externally threaded, centrally apertured adjustor nut adapted to be screwed into said ring to engage the axially outer face of said outer race and take up play in said bearing.

5. A motor vehicle axle assembly comprising:
(A) elongated, axially aligned left and right axle housings;
(B) left and right single piece axles each having
 (1) a shaft portion received within a respective housing and extending at its outer end beyond that housing and disposed at its inner end in juxtaposition to the inner end of the shaft portion of the other axle, and
 (2) a flange portion at the outer end of said shaft portion;
(C) a spacer block disposed between said inner ends;
(D) a tapered roller bearing mounted in each of said housings and rotatably receiving the respective axle adjacent the said outer end of its shaft portion;
(E) means restraining the inner race of each of said bearings against inward axial movement along the related shaft portion;
(F) a retainer member engaging the axially outer face of the outer race of one of said bearings and rigid with the related housing;
(G) an internally threaded ring member rigid with the outer end of the housing mounting the other bearing and concentric with said shaft portions; and
(H) an externally threaded centrally apertured adjustor nut adapted to be screwed into said ring member to engage the axially outer face of the outer race of said other bearings and take up the play in said other bearing and, through bodily axial movement of said shaft portions and said spacer block, take up the play in said one bearing.

6. A motor vehicle axle assembly comprising:
(A) elongated, axially aligned left and right axle housings;
(B) left and right single piece axles each having
 (1) a shaft portion received within a respective housing and extending at its outer end beyond that housing and disposed at its inner end in juxtaposition to the inner end of the shaft portion of the other axle, and
 (2) a flange portion at the outer end of said shaft portion;
(C) a spacer block disposed between said inner ends;
(D) a tapered roller bearing mounted in each of said housings and rotatably receiving the respective axle adjacent the said outer end of its shaft portion;
(E) means restraining the inner race of each of said bearings against inward axial movement along the related shaft portion;
(F) a retainer member engaging the axially outer face of the outer race of one of said bearings and rigid with the related housing;
(G) an internally threaded retainer ring rigid with the outer end of the housing mounting the other bearing and concentric with said shaft portions, said ring having an internal diameter less than the external diameter of, but greater than the axially outer internal diameter of, the outer race of said other bearing, whereby to preclude displacement of that race; and
(H) an externally threaded centrally apertured adjustor nut adapted to be screwed into said ring to engage the axially outer face of the outer race of said other bearing and take-up the play in said other bearing and, through bodily axial movement of said shaft portions and said spacer block, take up the play in said one bearing.

References Cited by the Examiner
UNITED STATES PATENTS

| | | | |
|---|---|---|---|
| 1,321,874 | 11/1919 | Zimmerman | 180—88 |
| 1,405,642 | 2/1922 | Vanderbeek | 301—126 |
| 1,659,858 | 2/1928 | Cooper | 208—189 |
| 2,986,435 | 5/1961 | Rundt | 308—207 |
| 3,023,057 | 2/1962 | Edwards | 180—88 X |
| 3,218,885 | 11/1965 | Puidokas | 308—207 X |

KENNETH H. BETTS, *Primary Examiner.*